United States Patent [19]

Aitken et al.

[11] Patent Number: 5,283,211
[45] Date of Patent: Feb. 1, 1994

[54] THALLIUM GERMANATE, TELLURITE, AND ANTIMONITE GLASSES

[75] Inventors: Bruce G. Aitken, Erwin; Douglas W. Hall; Mark A. Newhouse, both of Corning, all of N.Y.

[73] Assignee: Corning Incorporated, Corning, N.Y.

[21] Appl. No.: 947,810

[22] Filed: Sep. 21, 1992

Related U.S. Application Data

[62] Division of Ser. No. 813,536, Dec. 26, 1991, abandoned, which is a division of Ser. No. 618,939, Nov. 28, 1990, Pat. No. 5,093,288.

[51] Int. Cl.$^5$ ............................ C03C 3/12; C03C 3/32
[52] U.S. Cl. ........................................ 501/41; 501/21; 501/900
[58] Field of Search ............... 501/41, 73, 74, 900, 501/21, 22

[56] References Cited

U.S. PATENT DOCUMENTS

| B 286,499 | 1/1975 | Wylot | 501/42 |
| 2,863,782 | 12/1958 | Eubank | 501/41 |

FOREIGN PATENT DOCUMENTS

| 1511060 | 12/1966 | France . |
| 736073 | 8/1955 | United Kingdom . |
| 1066413 | 4/1967 | United Kingdom . |

OTHER PUBLICATIONS

Volf, "Chemical Approach to Glass", Glass Science and Technology #7, Elsevier Science Publishing Co. Inc., New York 1984, pp. 441-442.
Chemical Abstract No. 157164f, vol. 113, No. 18, F. F. Dzhalaladdinov et al., "Glass Formation Boundries & Physical Properties of the Bismuth Oxide-Gallium Oxide-Germanium Oxide Glass System", Oct. 29, 1990, p. 301.
IZV. AKAD. Nauk SSSR, Neorg. Mater., vol. 26, No. 8, 1990, pp. 1787-1788.
Journal of the American Ceramic Society, vol. 65, No. 4, Apr. 1982, Columbus US pp. 197-202; K. Nassau et al. "Glass Formation in the System $GeO_2$-$Bi_2O_3$-$Tl_2O$", the whole document.
Database WPIL, Section Ch, Week 8611, Derwent Publications Ltd., London, GB; Class L, AN 86-074908 & SU-A-1 175 899 (Beloruss Kirov Techn Ins), 30 Aug. 1985, abstract.
Chemical Abstracts, vol. 111, No. 16, 16 Oct. 1989, Columbus, Ohio, US; abstract No. 139334r, p. 322; abstract & JP-A-1 138 150 (Ohara K.K.) 31 May 1989.
Chemical Abstracts, vol. 107, No. 16, 19 Oct. 1987, Columbus, Ohio, US; abstract no. 139474d, p. 331; abstract & JP-A-62 036 040 (Iwashiro Glass K.K.) Feb. 17, 1987.
Journal of Non-Crystalline Solids. vol. 99, No. 2/3, Feb. 1988, Amsterdam NL, pp. 289-307; A. E. Miller et al. "The Intensity of RAMAN Scattering in Glasses Containing Heavy Metal Oxides", pp. 289-290, paragraph 2.
Chemical Abstracts, vol. 105, No. 14, Oct. 1986, Columbus, Ohio, US; abstract No. 119514x, p. 287; abstract & JP-A-61 086 447 (Sumita Optical Glass Mfg. Co.) 1 May 1986.

*Primary Examiner*—Mark L. Bell
*Assistant Examiner*—Michael A. Marcheschi
*Attorney, Agent, or Firm*—Clinton S. Janes, Jr.

[57] ABSTRACT

This invention relates to thallium germanate, tellurite, and antimonite glasses possessing high optical nonlinearity, as well as good visible and infrared transmission, making them suitable materials for the fabrication of active optical devices.

1 Claim, No Drawings

THALLIUM GERMANATE, TELLURITE, AND ANTIMONITE GLASSES

This is a division of application Ser. No. 07/813,536, filed Dec. 26, 1991, now abandoned, which is a division of application Ser. No. 07/618,939, filed Nov. 28, 1990, now U.S. Pat. No. 5,093,288.

RELATED APPLICATION

U.S. patent application Ser. No. 07/618,938, filed concurrently herewith by N. F. Borrelli et al. under the title GALLIOBISMUTHATE GLASSES, now U.S. Pat. No. 5,093,287, is directed to the production of glasses with superior infrared transmitting ability and high optical nonlinearity, and consisting essentially, in weight percent, of 42–48% PbO, 33–44% $Bi_2O_3$, 10–15% $Ga_2O_3$ and up to 15% total of at least one member selected from the group consisting of up to 5% total $SiO_2$ and/or $GeO_2$ and up to 15% $Tl_2O$.

BACKGROUND OF THE INVENTION

Active optical devices, which are currently being studied for use in future telecommunications and computational systems, require materials that are characterized by large optical nonlinearity. In such materials a light beam will cause a significant change in the optical properties of the medium, altering the propagation of other light beams (cross-modulation) or of itself (self-modulation). Many optical devices further require that the material have a fast response time and low optical loss. Glasses containing high concentrations of heavy metal oxides (HMO) have been found to display a high degree of optical nonlinearity which, due to its electronic nature, is further characterized by a rapid response time. For example, measurements on representative HMO glasses have shown a non-linear refractive index some 5OX that of vitreous silica. These features, coupled with excellent transmission in both the visible and infrared portions of the electromagnetic spectrum, render these materials ideal for a wide range of optical applications, including those where light induced phase changes, beam steering, optical phase conjugation, and bistability of resonator structures are desired.

Optical devices utilized in these applications require that the optical properties of the active material change in response to an applied optical field, the magnitude of this effect being characterized by a single term called the third order susceptibility tensor, $X^{(3)}$. The latter can be thought of as a coefficient in a power series expansion of the relationship between the applied electric field, E, and the polarization, P, written schematically as $$P = X^{(1)}E + X^{(2)}EE + X^{(3)}EEE + \ldots$$

where $X^{(1)}$ is the linear susceptibility tensor, $X^{(2)}$, is the second order susceptibility tensor, and so on. $X^{(1)}$, the linear susceptibility, is related to the linear refractive index, $n_o$, by $X^{(1)} = (n_o^2 - 1)/4\pi$.

When an optical field is applied to a material, such as a glass, the optical properties of the material are affected. The magnitude of this effect can be measured, and is characterized in the art by $X^{(3)}$. Illustrative of this phenomenon is the example where a high-intensity light beam is passed through a nonlinear medium, consequently inducing a change in the index of refraction. For a light beam of intensity I, the index of refraction can be described by the equation $$n = n_o + \gamma I$$

where n is the index of refraction, $n_o$ is the linear (low intensity) index, and $\gamma$ is the nonlinear refractive index of refraction. The nonlinear index, in turn, is related to $X^{(3)}$ by the equation $$\gamma = [(480\pi^2)/(n_o c^2)]X^{(3)}_{1111}$$

where $X^{(3)}_{1111}$ is the first diagonal term of the third order susceptibility tensor and c is the velocity of light. In a nonlinear device this change in refractive index is achieved when one light beam is used to manipulate the behavior of another.

One technique that may be used in measuring $X^{(3)}$ of various oxide glasses, called degenerate four wave mixing (DFWM), has shown that the maximum values of $X^{(3)}$ are attained in those glasses having the highest concentration of the heavy metals=thallium, lead, and bismuth. The ions of these metals, in their normal oxidation state in HMO glasses, i.e., $Tl^+$, $Pb^{++}$, and $Bi^{+3}$, have an electronic configuration which is essentially that of an inert gas plus two 6s electrons, Strictly speaking, the electronic configuration of these ions is $[Xe](4f^{14})(5d^{10})(6s^2)$, but, as the filled 4f and 5d shells as well as the xenon core comprise a spherically symmetric density, the configuration can be abbreviated as $6s^2$. These two 6s electrons comprise a stereochemically active lone electron pair in that they occupy a directed orbital, but this orbital is essentially non-bonding in character. The presence of this lone electron pair is responsible for the highly distorted geometry assumed by Tl—O, Pb—O, and, to a lesser extent, Bi-O coordination polyhedra, and is postulated to be the source of the high values of $X^{(3)}$ characteristic of HMO glasses.

DFWM measurements on a number of HMO glasses suggest that, of the three heavy metal ions, $Tl^+$ has the largest overall contribution on an atom-for-atom basis to the net $X^{(3)}$ of an HMO glass. Thus, oxide glasses with high concentrations of thallium are here identified as being especially well suited for the fabrication of nonlinear optical devices.

The enhanced nonlinearity of the HMO glasses described herein and waveguide structures that may be synthesized from these glasses make them useful in a number of device configurations, some of which can only be implemented in waveguide form (either fiber or planar waveguides), and some of which can also be implemented in bulk-optics form. Such devices include, but are not limited to: nonlinear mode coupling devices, nonlinear interference devices, and optical amplifiers, and areas where optical phase conjugation is desirable.

Nonlinear mode coupling devices operate through changing the coupling of two (or more) modes of a waveguide structure as a result of the third order susceptibility. They include various multi-core couplers and single-core devices where two or more modes of the waveguide structure (such as modes with different polarizations or spatial distributions) have their coupling altered through nonlinear interaction.

In nonlinear interference devices the relative phases of two or more light beams (or even various reflections of a single light beam) are changed by utilizing variations in the optical path length resulting from the third order susceptibility. Such differences are brought about by the change of index of refraction due to the nonlinearity. Representative of this group of nonlinear interference devices is a bulk or guided wave Mach-Zehnder interferometer, although Sagnac interferometers, Michelson-type interferometers, distributed feedback grating devices, and Fabry-Perot resonators may also be included.

When these HMO glasses are used in synthesizing optical amplifiers, the gain coefficients for stimulated Raman and Brillouin amplification are also enhanced. This gain can be used to amplify a signal beam using a pump beam in a guided-wave geometry.

In areas where optical phase conjugation is desired, four-wave mixing interactions (bulk or guided wave) are utilized, wherein three input optical waves interact via the third order susceptibility to form a fourth wave, called a phase conjugate wave, which has unique properties. These properties can be exploited for such uses as aberration corrections, optical memory, beam steering, generation of new wavelengths, and neural networks.

In summary, the primary objective of the present invention was to design new glasses containing large concentrations of thallium, which glasses will exhibit a high degree of optical nonlinearity as well as superior visible and infrared transmission, those properties rendering the glasses particularly suitable for use in the aforementioned general areas of application.

SUMMARY OF THE INVENTION

The above goals can be achieved within narrow composition intervals of the following three systems:
(a) $Tl_2O$—$Bi_2O_3$—$GeO_2$—$Ga_2O_3$;
(b) $TeO_2$—$Tl_2O$ and/or $PbO$—$SiO_2$; and
(c) $Sb_2O_3$—$Tl_2O$ and/or $PbO$—$SiO_2$.

More specifically, the glasses of the instant invention are selected from the following groups and consist essentially, expressed in terms of cation percent on the oxide basis, of:

(a) 15–60% $TlO_{0.5}$, 10–45% $BiO_{1.5}$, 5–40% $GeO_2$ and 0.5–10% $GaO_{1.5}$, wherein $BiO_{1.5}+TlO_{0.5} \geq 60\%$ and $GaO_{1.5}+GeO_2 \geq 15\%$, the sum of $TlO_{0.5}+BiO_{1.5}+GeO_2+GaO_{1.5}$ constituting at least 85% of the total composition. Desirably, up to 15% total of at least one member of the group in the indicated proportion of up to 10% $SiO_2$ and up to 5% $TeO_2$ may be included.

(b) 5–75% $TeO_2$, 0.5–20% $SiO_2$, 0–50% $TlO_{0.5}$, and 0–75% $PbO$, wherein $TlO_{0.5}+PbO \geq 25\%$, $TeO_2+SiO_2 \geq 25\%$, and $TeO_2+SiO_2+TlO_{0.5}+PbO$ constituting at least 65% of the total composition. Desirably, up to 35% total of at least one member of the group in the indicated proportion of up to 35% $WO_3$ and up to 25% $ZnO$ may be included.

(c) 35–804 $SbO_{1.5}$, 0–50% $TlO_{0.5}$, 0–40% $PbO$, and 0–10% $SiO_2$, wherein $TlO_{0.5}+PbO \geq 20\%$ and $SbO_{1.5}+SiO_2 \geq 45\%$.

$Tl_2O$—$Bi_2O_3$—$GeO_2$—$Ga_2O_3$ glasses are especially well suited for the fabrication of nonlinear optical devices due to their high concentrations of thallium. Thus, the stabilizing effect, i.e., the resistance of the glass to devitrification, imparted by $Ga_2O_3$ and $Bi_2O_3$ permits thallium concentrations as high as 60 cation percent to be employed without compromising glass stability, and allows the preparation of such thallium-rich glasses with up to 85% total heavy metal content, i.e., $TlO_{0.5}+BiO_{1.5}$. Such glasses would be expected to exhibit large nonlinear effects, and those effects have been confirmed through DFWM measurements.

Thallium and/or lead tellurite and/or antimonite glasses are also of great interest from the standpoint of nonlinear optical applications. Although the maximum permissible thallium concentrations in these glasses are less than 60% and thus lower than those attainable in the previous system, the network-forming components, tellurium and antimony, unlike germanium, are known to contribute significantly to $X^{(3)}$. This contribution may be due to the fact that both of the ions $Te^{4+}$ and $Sb^{3+}$, like $Tl^+$, $Pb^{++}$, and $Bi^{3+}$, have a stereochemically active lone electron pair, in this case $5s^2$, which is similarly expected to contribute to an enhanced value of $X^{(3)}$ in tellurite and antimonite glasses. In addition, these glasses exhibit excellent infrared transmission, as well as good chemical durability relative to other thallium-bearing glasses such as thallium silicates, borates, and/or germanates. The thallium tellurite glasses are further characterized by excellent transmission in the visible portion of the electromagnetic spectrum. $SiO_2$ is included in the tellurite glass compositions to assure glass stability and to improve their forming properties.

Whereas it is not mathematically possible to convert composition ranges expressed in terms of cation percent to exact composition ranges expressed in terms of weight percent, the following values represent approximations of the base compositions of the inventive glasses in terms of weight percent:

(a) 17.6–72.2% $Tl_2O$, 12.6–60.6% $Bi_2O_3$, 2.8–24.4% $GeO_2$, 0.2–5.7% $Ga_2O_3$, 0–3.6% $SiO_2$, and 0–4.7% $TeO_2$;

(b) 4.3–69.3% $TeO_2$, 0.2–7.9% $SiO_2$, 0–63.9% $Tl_2O$ and 0–89.3% $PbO$; and (c) 28.6–73.1% $Sb_2O_3$, 0–62.2% $Tl_2O$, and 0–.0% $PbO$.

PRIOR ART

A plethora of glass compositions are known to the art that have infrared transmitting characteristics. Included in such optical glass compositions are, for example, isotropic crystalline alkaline earth fluorides (U.S. Pat. No. 3,502,386), antimony sulfides (U.S. Pat. No. 3,002,842), germanium-arsenic-selenides/tellurides (U.S. Pat. No. 4,154,503), arsenic trisulfides (U.S. Pat. No. 2,979,382), and strontium and gallium compounds (U.S. Pat. No. 3,188,216), as well as methods for making infrared transmitting germanate glasses (U.S. Pat. No. 3,531,305). None of the glass compositions mentioned in these references coincides with those of the instant invention.

Oxides of tellurium, tungsten, tantalum, thallium, bismuth, barium, lead, and titanium were employed in synthesizing the optical glasses of U.S. Pat. No. 3,291,620 (Evstropjev), whereas at least two members from the group consisting of tungsten, molybdenum, bismuth, and arsenic and one member selected from the group of oxides and fluorides consisting of magnesium, calcium, strontium, barium, and lead, were utilized in U.S. Pat. No. 3,531,304 (Bromer). Neither reference mentions the use of $Ga_2O_3$.

Optical waveguide fibers have been constructed from some of these infrared transmitting optical glasses as illustrated in U.S. Pat. Nos. 3,209,641 and 4,451,116, wherein fibers were constructed from arsenic and sulfur, and fibers were extruded from halides of thallium, respectively.

U.S. Pat. No. 3,723,141 (Dumbaugh, Jr.) is directed to the formation of infrared transmitting glasses consisting essentially, expressed in terms of weight percent on the oxide basis, of 10-85% $Bi_2O_3$ 10-75% PbO, $Bi_2O_3$+Pbo>60%, 2-25% BaO, 1-10% ZnO, $SiO_2$+$B_2O_3$+$P_2O_5$ <1%, and up to 20% total of the following components in amounts not exceeding 10% individually: CaO, SrO, CdO, Hgo, $Tl_2O_3$, $TiO_2$, $GeO_2$, $Sb_2O_3$, $As_2O_3$, the transition metal oxides, and the alkali metal oxides. $Ga_2O_3$ is nowhere mentioned in the patent.

U.S. Pat. No. 3,837,867 (Dumbaugh, Jr.) is concerned with infrared transmitting glasses consisting essentially, expressed in terms of cation percent on the oxide basis, of 33-68% PbO, 2.5-27% CdO, 10-30% $Fe_2O_3$, and 4-28% $Tl_2O$. Those ranges correspond to the following approximate weight percentages: 40-80% PbO, 4-35% $Tl_2O$ 2-22% CdO, and 4-15% $Fe_2O_3$. $Ga_2O_3$ is nowhere referred to in the patent.

U.S. Pat. No. 3,837,868 (Berleue et al.) describes infrared transmitting glasses consisting essentially, expressed in terms of cation percent on the oxide basis, of 8-80% $Bi_2O_3$, 0-57% PbO, 0-32% CdO, at least 5% Pbo—Cdo, 5-32.5% $Fe_2O_3$, and 0-15% other compatible glassmaking constituents. $Ga_2O_3$ is nowhere mentioned in the patent and $TeO_2$ is preferably absent from the compositions.

U.S. Pat. No. 4,456,692 (Dumbaugh, Jr. et al.) discloses lead-free glasses consisting essentially, expressed in terms of weight percent on the oxide basis, of 40-90% $Bi_2O_3$, 5-30% $Ga_2O_3$, 0-35% CdO (the preferred glasses contain 4-28% CdO), up to 3% chlorine, and up to 30% total of the following oxides in the indicated proportions of 0-10% $Cs_2O$, 0-25% HgO, 0-3% $GeO_2$ and 0-4% $Sb_2O_3$. The glass compositions are stated explicitly to be free of lead.

French Patent No. 1,549,090 discloses a number of glasses that are transparent to infrared rays having compositions within the system $GeO_2$—$Bi_2O_3$ and/or $Tl_2O_3$ wherein PbO and/or $PbF_2$ may optionally be present. No reference is made to $Ga_2O_3$.

In "Nonlinear Optical Properties of Glasses and Glassor Gel-Based Compositions," *Optical Engineering*, 26, pp. 102-106, February 1987, Hiroyuki Nasu and John MacKenzie discuss the potentially large optical nonlinearity of the following two glass compositions originally covered by U.S. Pat. Nos. 4,456,692 and 4,483,931, expressed in terms of weight percent on the oxide basis: 83% $Bi_2O_3$, 7.2% Ga and 9.8% CdO; and 42% $Bi_2O_3$, 46% PbO, and 12% $Ga_2O_3$.

No reference is made to additions of $TeO_2$ and/or $Geo_2$.

In "Properties and Structure of the Binary Tellurite Glasses containing Mono- and Divalent Cations," *Ceramic Society Journal*, 86 (7) 1978, p. 317-326, authored by N. Mochida, K. Nakata, and S. Shibusawa, the glass formation ranges of the binary tellurite systems $MO_{\frac{1}{2}}$—$TeO_2$ (where M is Li, Na, K, Rb, Cs, Ag, or Tl) and $MO$-$TeO_2$ (where M is Be, Mg, Ca, Sr, Ba, Zn, Cd, or Pb) were investigated. In that work there is no discussion of ternary or quaternary glass systems, of the inclusion of trivalent and quadrivalent ions such as $Bi^{+3}$, $Sb^{+3}$, and $Si^{+4}$, or of the nonlinear optical properties of tellurite glasses and of the possible use of said glasses in the fabrication of active optical devices.

In "Glass Formation in the System $GeO_2$—$Bi_2O_3$—$Tl_2O$," *Journal of the American Ceramic Society*, 65(1982), 197-203, authored by K. Nassau and D. L. Chadwick, the occurrence of glasses in the ternary oxide system containing Ge, Bi, and Tl was studied. No reference was made to $Ga_2O_3$ so there was no recognition of its significant effect upon the stability of the ternary glasses. Furthermore, there was no discussion of glasses expressly devised for applications in active optical devices.

The journal article immediately above was referred to in U.S. Pat. No. 4,790,619 (Lines et al.), the object of the patent being to produce a Raman-active optical fiber of very high Raman cross section utilizing glass compositions described in that journal article among others. Thus, the patentees directed their invention to core glasses of a Raman-active optical fiber comprising a glass forming first major component selected from the group consisting of $GeO_2$, $SiO_2$, $AsO_{1.5}$, and combinations thereof, and a heavy metal oxide second major component selected from the group consisting of PbO, $BiO_{1.5}$, $SbO_{1.5}$, $TlO_{0.5}$, and combinations thereof. Neither $Ga_2O_3$ nor $TeO_2$ is mentioned in the patent and the working examples containing $Sb_2O_3$ are quite outside those of the present invention.

In a paper presented at the Nonlinear Optics conference held in Kauai, Hawaii on July 16-20, 1990, entitled "Two-Photon Absorption in High-Nonlinearity Fibers," D. L. Weidman, J. C. Lapp, and M. A. Newhouse make general reference to the fabrication of a multimode lead-bismuthgallate composition fiber. However, no specific glass composition is disclosed.

In "Third Order Nonlinear Integrated Optics," *Journal of Lightwave Technology*, 6, pp. 953-967, June 1988, G. I. Stegeman, E. M. Wright, N. Finlayson, R. Zanoni, and C. T. Seaton discuss, in generic terms, the scientific principles that make possible the construction of nonlinear optical devices from optical waveguides, namely Mach-Zehnder interferometers, grating and prism couplers, grating reflectors, directional couplers, and mode sorters. Though many of these devices coincide with those of the instant invention, no reference is made to specific glass compositions that are suitable for such devices.

DESCRIPTION OF PREFERRED EMBODIMENTS

Table I records a group of glass compositions melted on a laboratory scale and reported in terms of parts by weight on the oxide basis illustrating the present invention. Because the sum of the individual components totals or very closely approximates 100, for all practical purposes the tabulated values may be deemed to represent weight percent. Table IA recites the same group of glass compositions expressed in terms of cation percent. The actual batch ingredients may comprise any materials, either oxides or other compounds, which, when melted together, are converted into the desired oxides in the proper proportion. For example, either $TlNO_3$ or $Tl_2CO_3$ may be employed as the source of thallium.

The batch ingredients were compounded, tumble mixed together to assist in securing a homogeneous melt, and then charged into gold, platinum, or VYCORR® brand crucibles. After placing lids thereon, the crucibles were introduced into a furnace operating at about 800° to 1100° C. and the batches were melted for about 15 to 60 minutes. The melts were subsequently poured into steel or graphite molds to yield glass discs having a diameter of about 111 and a thickness of about 5mm which were transferred immediately to an annealer operating at about 175° to 300° C.

TABLE I

| | 1 | 2 | 3 | 4 | 5 | 6 | 7 |
|---|---|---|---|---|---|---|---|
| $Tl_2O$ | 54.8 | 55.9 | 56.0 | 56.1 | — | — | 17.6 |
| PbO | — | — | — | — | 78.0 | 73.2 | 55.4 |

TABLE I-continued

| | | | | | | | |
|---|---|---|---|---|---|---|---|
| $Bi_2O_3$ | 30.3 | 30.6 | 30.7 | 30.8 | — | — | — |
| $Ga_2O_3$ | — | 2.5 | 4.5 | 6.2 | — | — | — |
| $SiO_2$ | — | — | — | — | 4.8 | 4.9 | 5.0 |
| $GeO_2$ | 10.8 | 11.0 | 6.9 | 6.9 | — | — | — |
| $TeO_2$ | 4.1 | — | — | — | 17.2 | 21.8 | 22.0 |

| | 8 | 9 | 10 | 11 | 12 | 13 | 14 |
|---|---|---|---|---|---|---|---|
| $Tl_2O$ | 46.9 | 57.9 | 44.0 | 54.4 | 32.7 | 30.9 | 18.4 |
| PbO | — | — | — | — | — | 13.1 | 19.4 |
| $Sb_2O_3$ | — | — | 56.0 | 45.6 | 67.3 | 56.0 | 62.0 |
| $SiO_2$ | 0.3 | 0.3 | — | — | — | — | — |
| $TeO_2$ | 52.8 | 47.8 | — | — | — | — | — |

| | 15 | 16 |
|---|---|---|
| $Tl_2O$ | 48.6 | 50.9 |
| $TeO_2$ | 24.3 | 41.1 |
| $SiO_2$ | 0.3 | 0.4 |
| $WO_3$ | 26.9 | — |
| ZnO | — | 7.7 |

TABLE IA (Cation Percent)

| | 1 | 2 | 3 | 4 | 5 | 6 | 7 |
|---|---|---|---|---|---|---|---|
| $TlO_{0.5}$ | 50.0 | 50.0 | 50.0 | 50.0 | — | — | 15.0 |
| PbO | — | — | — | — | 65.0 | 60.0 | 45.0 |
| $BiO_{1.5}$ | 25.0 | 25.0 | 25.0 | 25.0 | — | — | — |
| $GaO_{1.5}$ | — | 5.0 | 9.0 | 12.5 | — | — | — |
| $SiO_2$ | — | — | — | — | 15.0 | 15.0 | 15.0 |
| $GeO_2$ | 20.0 | 20.0 | 16.0 | 12.5 | — | — | — |
| $TeO_2$ | 5.0 | — | — | — | 20.0 | 25.0 | 25.0 |

| | 8 | 9 | 10 | 11 | 12 | 13 | 14 |
|---|---|---|---|---|---|---|---|
| $TlO_{0.5}$ | 39.5 | 44.5 | 35.0 | 45.0 | 25.0 | 25.0 | 14.5 |
| PbO | — | — | — | — | — | 10.0 | 14.5 |
| $SbO_{1.5}$ | — | — | 65.0 | 55.0 | 75.0 | 65.0 | 71.0 |
| $SiO_2$ | 1.0 | 1.0 | — | — | — | — | — |
| $TeO_2$ | 59.5 | 54.5 | — | — | — | — | — |

| | 15 | 16 |
|---|---|---|
| $TlO_{0.5}$ | 45.6 | 40.5 |
| $TeO_2$ | 30.4 | 43.5 |
| $SiO_2$ | 0.9 | 1.0 |
| $WO_3$ | 23.1 | — |
| ZnO | — | 16.0 |

Table II records the density ($\rho$) in grams/cm$^3$ and linear index of refraction ($n_D$) determined in accordance with measuring techniques conventional in the glass art, as well as the first diagonal term of the third order susceptibility tensor ($X^{(3)}$) in units of $10^{-14}$ esu as measured by the aforementioned technique of degenerate four wave mixing.

TABLE II

| | 1 | 2 | 3 | 4 | 5 | 6 | 7 |
|---|---|---|---|---|---|---|---|
| $\rho$ | 7.891 | 7.783 | 7.913 | 7.904 | 7.402 | 7.210 | 7.186 |
| $n_D$ | 2.44 | — | 2.35 | — | — | 2.27 | — |
| $X^{(3)}$ | 71 ± 11 | — | 88 ± 13 | — | — | 40 ± 6 | — |

| | 8 | 9 | 10 | 11 | 12 | 13 | 14 |
|---|---|---|---|---|---|---|---|
| $\rho$ | 6.693 | 6.882 | 6.445 | 6.654 | 6.132 | 5.931 | 5.813 |
| $n_D$ | 2.27 | 2.28 | — | — | 2.22 | — | — |
| $X^{(3)}$ | — | — | — | — | 32 ± 5 | — | — |

TABLE II-continued

| | 15 | 16 |
|---|---|---|
| $\rho$ | 7.449 | 6.570 |
| $n_D$ | — | — |
| $X^{(3)}$ | — | — |

It is noteworthy that the value of $X^{(3)}$ for Example 3, $88 \times 10^{-14}$ esu, is, to the best of our knowledge, the largest nonlinear susceptibility that has been measured for any oxide glass and is roughly 250X that of vitreous silica.

Based upon an overall review of physical properties and melting and forming characteristics, the preferred compositions of the present inventive glasses consist essentially, in cation percent on the oxide basis, of (a) 38-60% $TlO_{0.5}$, 10-45% $BiO_{1.5}$, 5-30% $GeO_2$, and 5-10% $GaO_{1.5}$, the sum of $TlO_{0.5}+BiO_{1.5}+GeO_2+GaO_{1.5}$ constituting at least 90% of the total composition;

(b) 20-40% $TeO_2$, 5-20% $SiO_2$, 0-50% $TlO_{0.5}$, and 10-65% PbO, the sum of $TeO_2+SiO_2+TlO_{0.5}30$ PbO constituting at least 70% of the total composition; and (c) 50-75% $SbO_{1.5}$, 5-50% $TlO_{0.5}$, and 0-20% PbO. In the glasses defined in paragraph (a), up to 10% total of at least one member of the group in the indicated proportion of up to 10% $SiO_2$ and up to 5% $TeO_2$ may desirably be included. In the glasses defined in paragraph (b), up to 30% total of at least one member of the group in the indicated proportion of up to 30% $WO_3$ and up to 20% ZnO may desirably be included.

Our most preferred composition is Example 3.

Application of the aforementioned glasses to devices may necessitate the synthesis of an optical waveguide structure. As is generally known to one skilled in the art, in order for such a structure to operate properly there must be a difference in refractive index existing between the core and cladding. This difference is dependent upon the type of waveguide, i.e., a single mode or multimode, and upon the use of the waveguide, e.g., whether the fiber is used in a straight configuration or whether bent. Accordingly, whereas both the core and the cladding glasses can be prepared from compositions within the same inventive ranges, it will be appreciated that the compositions of the core and cladding glasses will be sufficiently dissimilar to achieve a desired difference in refractive index between the core and cladding.

While the principles of the instant invention have been described above in connection with specific embodiments and particular modifications thereof, it is to be clearly understood that this description is made only by way of example, and not as a limitation on the scope of the invention. Said principles may be otherwise embodied within the scope of the following claims.

We claim:

1. A glass exhibiting high optical nonlinearity along with high transmission in the visible and infrared portions of the radiation spectrum consisting essentially, expressed in terms of cation percent on the oxide basis, of:

(c) 50-75% $SbO_{1.5}$, 5-50% $TlO_{0.5}$, and 0-20% PbO.

* * * * *

UNITED STATES PATENT AND TRADEMARK OFFICE
CERTIFICATE OF CORRECTION

PATENT NO. : 5,283,211

DATED : February 1, 1994

INVENTOR(S) : BRUCE G. AITKEN, DOUGLAS W. HALL, MARK A. NEWHOUSE

It is certified that error appears in the above-identified patent and that said Letters Patent is hereby corrected as shown below:

Column 3, line 54, "35-804" should read --35-80%--.

Column 3, line 55-56, "$SbO_{1.5}SiO_2$" should read --$SbO_{1.5}+SiO_2$--.

Column 5, line 2, "Pbo" should read --PbO--.

Column 5, line 47, "Geo$_2$" should read --GeO$_2$--.

Column 6, lines 55-56, "VYCORR$^R$" should read --VYCOR$^R$--.

Column 6, line 61, "111" should read --1"--.

Signed and Sealed this

Twenty-eighth Day of June, 1994

Attest:

BRUCE LEHMAN

*Attesting Officer*   Commissioner of Patents and Trademarks